(12) United States Patent
Richmond

(10) Patent No.: US 10,585,803 B2
(45) Date of Patent: Mar. 10, 2020

(54) SYSTEMS AND METHODS FOR ADDRESSING A CACHE WITH SPLIT-INDEXES

(71) Applicant: Linear Algebra Technologies Limited, Dublin (IE)

(72) Inventor: Richard Richmond, Belfast (GB)

(73) Assignee: Movidius Limited, Schiphol-Rijk (NL)

( * ) Notice: Subject to any disclaimer, the term of this patent is extended or adjusted under 35 U.S.C. 154(b) by 0 days.

(21) Appl. No.: 16/266,997

(22) Filed: Feb. 4, 2019

(65) Prior Publication Data

US 2019/0251032 A1 Aug. 15, 2019

Related U.S. Application Data

(63) Continuation of application No. 15/903,579, filed on Feb. 23, 2018, now Pat. No. 10,198,359, which is a continuation of application No. 14/716,588, filed on May 19, 2015, now Pat. No. 9,916,252.

(51) Int. Cl.
| | | |
|---|---|---|
| *G06F 12/00* | (2006.01) | |
| *G06F 13/00* | (2006.01) | |
| *G06F 12/0884* | (2016.01) | |
| *G06F 12/0804* | (2016.01) | |
| *G06F 12/0842* | (2016.01) | |
| *G06F 12/0875* | (2016.01) | |

(Continued)

(52) U.S. Cl.
CPC ...... *G06F 12/0884* (2013.01); *G06F 12/0804* (2013.01); *G06F 12/0811* (2013.01); *G06F 12/0842* (2013.01); *G06F 12/0875* (2013.01); *G06F 12/0895* (2013.01); *G06F 2212/283* (2013.01); *G06F 2212/455* (2013.01)

(58) Field of Classification Search
CPC ............. G06F 12/0884; G06F 12/0804; G06F 12/0811; G06F 12/0842; G06F 2212/455
See application file for complete search history.

(56) References Cited

U.S. PATENT DOCUMENTS

| | | | |
|---|---|---|---|
| 5,136,697 A | 8/1992 | Johnson | |
| 5,687,350 A * | 11/1997 | Bucher | ............... G06F 12/0859 |
| | | | 711/140 |
| 6,230,231 B1 | 5/2001 | DeLong et al. | |

(Continued)

FOREIGN PATENT DOCUMENTS

EP 2323039 5/2011

OTHER PUBLICATIONS

United States Patent and Trademark Office, "Notice of Allowance," mailed in connection with U.S. Appl. No. 15/903,579, dated Sep. 28, 2018, 8 pages.

(Continued)

*Primary Examiner* — Sean D Rossiter
(74) *Attorney, Agent, or Firm* — Hanley, Flight & Zimmerman, LLC

(57) ABSTRACT

Cache memory mapping techniques are presented. A cache may contain an index configuration register. The register may configure the locations of an upper index portion and a lower index portion of a memory address. The portions may be combined to create a combined index. The configurable split-index addressing structure may be used, among other applications, to reduce the rate of cache conflicts occurring between multiple processors decoding the video frame in parallel.

20 Claims, 15 Drawing Sheets

(51) Int. Cl.
   *G06F 12/0895* (2016.01)
   *G06F 12/0811* (2016.01)

(56) References Cited

U.S. PATENT DOCUMENTS

| | | | | |
|---|---|---|---|---|
| 6,339,822 | B1* | 1/2002 | Miller | G06F 9/30149 711/125 |
| 6,477,613 | B1 | 11/2002 | Arimilli et al. | |
| 8,171,200 | B1 | 5/2012 | O'Connor et al. | |
| 9,524,163 | B2 | 12/2016 | Godard et al. | |
| 9,916,252 | B2 | 3/2018 | Richmond | |
| 10,198,359 | B2 | 2/2019 | Richmond | |
| 2004/0083350 | A1* | 4/2004 | Luick | G06F 9/355 711/219 |
| 2006/0047883 | A1 | 3/2006 | O'Connor et al. | |
| 2007/0233961 | A1 | 10/2007 | Banning et al. | |
| 2008/0059728 | A1* | 3/2008 | Daly | G06F 12/08 711/158 |
| 2011/0161600 | A1* | 6/2011 | Hirano | G06F 9/30043 711/141 |
| 2012/0210069 | A1* | 8/2012 | Bayer | G06F 12/084 711/122 |
| 2014/0040541 | A1 | 2/2014 | Yoo et al. | |
| 2014/0040550 | A1* | 2/2014 | Nale | G06F 13/42 744/118 |
| 2014/0089344 | A1* | 3/2014 | Hong | G06F 16/9566 707/772 |

OTHER PUBLICATIONS

United States Patent and Trademark Office, "Corrected Notice of Allowability," mailed in connection with U.S. Appl. No. 14/716,588, dated Nov. 6, 2017, 4 pages.
United States Patent and Trademark Office, "Notice of Allowance," mailed in connection with U.S. Appl. No. 14/716,588, dated Oct. 26, 2017, 7 pages.
United States Patent and Trademark Office, "Notice of Allowance," mailed in connection with U.S. Appl. No. 14/716,588, dated Jul. 6, 2017, 8 pages.
International Bureau, "International Preliminary Report on Patentability," mailed in connection with International Patent Application No. PCT/IB2016/000709, dated Nov. 21, 2017, 7 pages.
Department of Electrical, Computer and Energy Engineering, "Cache Organization," University of Colorado Boulder, Apr. 18, 2002, 5 pages. Retrieved from http://ecee.colorado.edu/~ecen2120/Manual/caches/cache.
International Searching Authority, "International Search Report and Written Opinion," mailed in connection with International Patent Application No. PCT/IB2016/000709, dated Oct. 7, 2016, 10 pages.
Alvarez et al., "Performance Evaluation for Macroblock-level Parallelization of H.264 Decoding on a cc-NUMA Multiprocessor Architecture," Proc. of the 4th Colombian Computing Conference, 2009, 9 pages.
Kim et al., "Cache Organizations for H.264/AVC Motion Compensation," IEEE 13th International Conference on Embedded and Real-Time Computing Systems and Applications (RTCSA), Aug. 21-24, 2007, 8 pages.
Mesa et al., "Scalability of Macroblock-level Parallelism for H.264 Decoding," IEEE 15th International Conference on Parallel and Distributed Systems (ICPADS), Dec. 8-11, 2009, pp. 236-243.
Fourcc "YUV Pixel Formats," fourcc, retrieved Jun. 3, 2015, 18 pages. Retrieved from http://www.fourcc.org/yuv.php#NV12.
Korean Intellectual Property Office, "Notice of Preliminary Rejection," mailed in connection with Korean Patent Application No. 2017-7033282, dated May 9, 2019, 10 pages.

\* cited by examiner

FIG. 9A

| MB000-003 | MB004-007 | MB008-011 | MB012-015 | MB016-019 | MB020-023 | MB024-027 | ... | MB076-079 |
|---|---|---|---|---|---|---|---|---|
| 0,4,8..60 | 1,5,9..61 | 2,6,10..62 | 3,7,11..63 | 0,4,8..60 | 1,5,9..61 | 2,6,10..62 | ... | 3,7,11..63 |
| MB080-083 | MB084-087 | MB088-091 | MB092-095 | MB096-099 | MB100-103 | MB104-107 | ... | MB156-159 |
| 64,68..124 | 65,69..125 | 66,70..126 | 67,68..127 | 64,68..124 | 65,69..125 | 66,70..126 | ... | 67,68..127 |
| MB160-163 | MB164-167 | MB168-171 | MB172-175 | MB176-179 | MB180-183 | MB184-187 | ... | MB236-239 |
| 128..188 | 129..189 | 130..190 | 131..191 | 128..188 | 129..189 | 130..190 | ... | 131..191 |
| MB240-243 | MB244-247 | MB248-251 | MB252-255 | MB256-259 | MB260-263 | MB264-267 | ... | MB316-319 |
| 192..252 | 193..253 | 194..254 | 195..255 | 192..252 | 193..253 | 194..254 | ... | 195..255 |
| MB320-323 | MB324-327 | MB328-331 | MB332-335 | MB336-339 | MB340-343 | MB344-347 | ... | MB396-399 |
| 256..316 | 257..317 | 258..318 | 259..319 | 256..316 | 257..317 | 258..318 | ... | 259..319 |

FIG. 10

SYSTEMS AND METHODS FOR ADDRESSING A CACHE WITH SPLIT-INDEXES

CROSS-REFERENCE TO RELATED APPLICATIONS

This patent arises from a continuation of U.S. patent application Ser. No. 15/903,579, filed on Feb. 23, 2018, entitled "SYSTEMS AND METHODS FOR ADDRESSING A CACHE WITH SPLIT-INDEXES," which is a continuation of U.S. patent application Ser. No. 14/716,588, filed on May 19, 2015, entitled "SYSTEMS AND METHODS FOR ADDRESSING A CACHE WITH SPLIT-INDEXES." Priority to U.S. patent application Ser. Nos. 15/903,579 and 14/716,558 is claimed. U.S. patent application Ser. Nos. 15/903,579 and 14/716,588 are hereby incorporated by reference herein in their respective entireties.

FIELD OF THE APPLICATION

This present application relates generally to addressing a configurable central processing unit (CPU) cache utilizing a split-index address structure.

BACKGROUND

Performance of computer processors has increased exponentially for much of the past half century. Continued improvement in processing performance requires the constant development of new technologies and methods. One known performance improvement technique involves the use of a processor cache. The cache offers greatly improved data access times over the main memory, but is limited in its storage capacity. Due to the performance enhancements they offer, caches have seen near uniform adoption in the field.

Another technology used to improve processor performance is the use of multiple processors in parallel. In these scenarios, when a system uses multiple processors, the various processing cores may share access to a single cache. This beneficially allows each processor to read data that was cached by another processor. However, if each the plurality of processors accesses different portions of a file in parallel, the memory accessed by each processor is likely to be spatially distant (that is, likely to be located at rows and columns of the memory far away from one another). For that reason, in such scenarios there is a substantial likelihood that the processors may request data that maps to the same cache line, creating a conflict. Cache conflicts are costly, causing the processor to read from the main memory instead, leading to substantially reduced performance. Accordingly, there is a need to improve cache performance for use with multiple processors in parallel when the parallel processors are likely to access spatially distant portions of a file in memory.

SUMMARY

In accordance with the disclosed subject matter, systems and methods are provided for addressing a configurable cache with split indexes. In some embodiments, a method for storing elements from a main memory into a cache comprises associating each of a plurality of cache lines from a cache memory with a different one of a plurality of indexes, wherein one of the plurality of indexes comprises a first combined index; defining a first set of bits from a first address associated with a first memory location from the main memory as a first index portion and a second set of bits from the first address as a second index portion; generating the first combined index by concatenating the first index portion and the second index portion; and mapping at least the first memory location to a first cache line from the plurality of cache lines based on the first combined index.

The method can further comprise defining a third set of bits from the first address as an offset, wherein the offset determines a position within the first cache line of the first memory location. The method can further comprise storing, within the plurality of cache lines, a plurality of blocks of data from a frame of a high-definition video stored in the main memory. The method can further comprise scheduling read and write requests to the cache memory from a first processor and a second processor. The method can further comprise reading, via the first processor, a first block of data located in a first column of the main memory; simultaneously reading, via the second processor, a second block of data located in the first column of the main memory; and storing the first block of data and the second block of data into the cache memory.

In some embodiments a cache for storing data elements from a main memory, comprises a cache memory comprising a plurality of cache lines that is each referenced by a different one of a plurality of indexes, wherein one of the plurality of indexes comprises a first combined index; an index configuration register configured to define a first set of bits from a first address associated with a first memory location from the main memory as a first index portion and a second set of bits from the first address as a second index portion; an index generation module configured to receive the first index portion and the second index portion as defined by the index configuration register, and to generate the first combined index by concatenating the first index portion and the second index portion; and a memory address mapping module for mapping at least the first memory location to a first cache line from the plurality of cache lines based on the first combined index.

The index configuration register can be further configured to define a third set of bits from the first address as an offset, wherein the offset determines a position within the first cache line of the first memory location. The plurality of cache lines can be configured to store a plurality of blocks of data from a frame of a high-definition video stored in the main memory. The memory address mapping module can be further configured to map at least two of the plurality of blocks of data from one row of the frame of the high-definition video to one cache line from the plurality of cache lines. The cache can further comprises an access arbitration module configured to schedule read and write requests to the cache memory from a first processor and a second processor. The access arbitration module can be further configured to permit simultaneous read and write requests to different cache lines from the plurality of cache lines by the first processor and the second processor.

In some embodiments, a non-transitory computer readable storage medium having stored thereon, computer executable instructions that, if executed by a computer system cause the computer system to perform a method for storing elements from a main memory into a cache, said method comprising associating each of a plurality of cache lines from a cache memory with a different one of a plurality of indexes, wherein one of the plurality of indexes comprises a first combined index; defining a first set of bits from a first address associated with a first memory location from the main memory as a first index portion and a second set of bits from the first address as a second index portion; generating the first combined index by concatenating the first index portion and the second index portion; and mapping at least the first memory location to a first cache line from the plurality of cache lines based on the first combined index.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements. The accompanying figures are schematic and are not intended to be drawn to scale. For purposes of clarity, not every component is labelled in every figure. Nor is every component of each embodiment of the disclosed subject matter shown where illustration is not necessary to allow those of ordinary skill in the art to understand the disclosed subject matter.

FIGS. 9A-9B illustrate the mapping of a cache onto image blocks in accordance with some embodiments.

FIG. 10 illustrates an exemplary cache mapping scheme onto an image frame in accordance with some embodiments.

DETAILED DESCRIPTION

Figure 1:
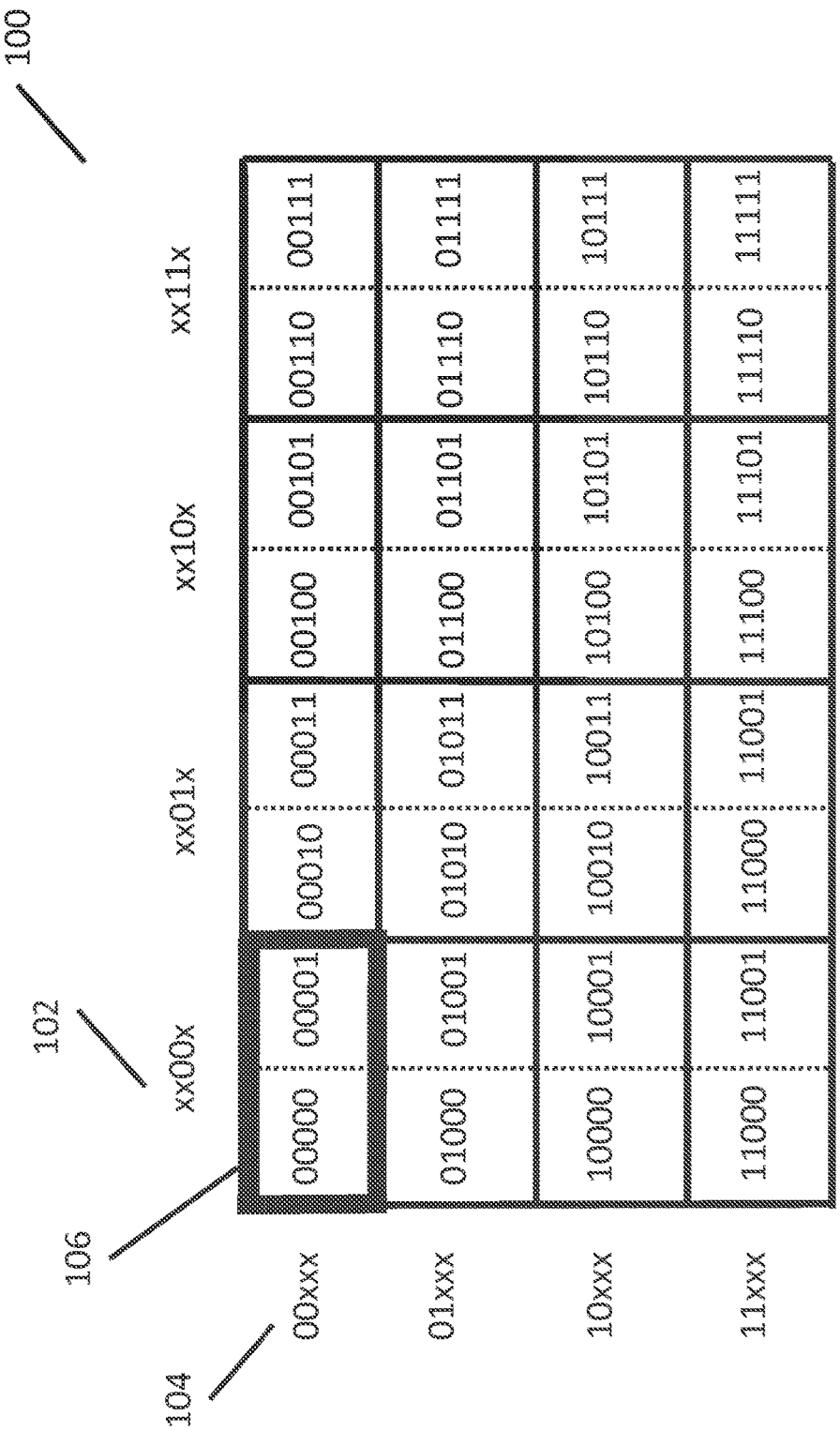
FIG. 1 illustrates an exemplary computer memory and associated addressing scheme.

In the following description, numerous specific details are set forth regarding the systems and methods of the disclosed subject matter and the environment in which such systems and methods may operate, etc., in order to provide a thorough understanding of the disclosed subject matter. It will be apparent to one skilled in the art, however, that the disclosed subject matter may be practiced without such specific details, and that certain features, which are well known in the art, are not described in detail in order to avoid complication of the disclosed subject matter. In addition, it will be understood that the examples provided below are exemplary, and that it is contemplated that there are other systems and methods that are within the scope of the disclosed subject matter.

Embodiments of the disclosure are directed to improved cache performance for a parallel processing system. Cache memory has been utilized by processors to improve performance for decades. In general, cache memory is a small memory capable of fast read times that are at least an order of magnitude shorter than read times from the main memory. As a trade-off, this fast-performing cache memory must be small to allow for the increase in performance. For that reason, it is important to use efficient methods for selecting the location in which to store data in the cache memory.

When parallel processors share a cache, they may each read and write to lines of the cache in parallel. Typically, a queueing system would arbitrate simultaneous requests to prevent conflicts. This scheme is beneficial as long as the processors are unlikely to read data that maps to overlapping areas of the cache. However, utilizing a shared cache will cause a decrease in performance whenever two processors attempt to read from different lines of memory that happen to map to the same line of the cache (in other words, when there is a conflict). If each of the parallel processors are known to make accesses to different lines in memory, certain cache addressing schemes may be employed to eliminate the possibility of cache conflicts due to accesses from multiple processors. One such technique, referred to as a split-index address structure, is particularly well suited to alleviate conflicts arising due to certain cache access patterns, and is described below.

One form of processing utilizing cache memory that may be improved by such a scheme is the decoding of high definition video. Though many formats remain in use today, one format that has seen wide adoption in the field is H.264/MPEG-4 Part 10, Advanced Video Coding (H.264 or MPEG-4 AVC). To improve decoding times for high definition video playback, the plurality of processing cores may each write to a single cache shared amongst the cores. Although the remaining discussion generally relates to H.264 video, other forms of video compression, or other forms of processing not related to video compression may benefit from the storage methods disclosed herein.

One feature of high definition video, and, in particular, H.264 video, is that when video frames are buffered into memory, an entire frame is stored in memory as a contiguous block of addresses such that the address of the first byte on a line in the buffer is also the first byte of a line in the video frame. In other words, one line of a video frame is stored on one line of the memory buffer, even if the memory buffer is wider than the width of the video frame. This buffer filling scheme is referred to as "tiling" into memory, and may be utilized when the horizontal "stride" of the memory (the width of the rows of the memory) is greater than the horizontal resolution of the video frame. This may leave some space beyond the end of each line of memory unused, padding the lines out to some physical boundary.

When decoding video frames that have been tiled into memory, different processors may decode different lines of a video frame in parallel. For example, a first processor may decode a first line, while a second processor decodes a second line. Because cache lines are typically mapped such that consecutive lines in the cache map to consecutive columns within a row of memory, each of the plurality of processors may, at a particular time, use a block of data that happens to map to the same cache line as the other processors. In this situation, a conflict is created, since one line of the cache cannot store two different blocks. Thus, at least one of the blocks being accessed by the plurality of processors must be retrieved from the main memory. To reduce the miss rate of a cache shared between a plurality of processors, embodiments of the disclosure propose techniques specific to the storage methods associated with H.264 high definition video, or other block based video algorithms such as MPEG or MPEG2. However, it should be appreciated that these techniques may be extended to improve cache performance in other parallelized high definition video processing, or other suitable data processing The H.264 video format contains a number of unique features that may be used in conjunction with the split-index cache entry address structure described below. The data representing video in H.264 is stored as a series of individual frames. The stored frames are further subdivided into large, discrete blocks of information known as "macroblocks," which are discussed in more detail below. When reconstructing the compressed video stream certain frames known as "reference frames" are saved and used to reconstruct intermediate frames which lie between the reference frames in time. The intermediate frames are reconstructed as the difference between the frame to be rendered and the closest reference frame in memory. This method of generating video frames based on the differences between a current frame and from a reference frame is known as "motion compensation," and provides significant compression, but also requires additional processing power.

The following examples provide background regarding the mapping of main memory to cache lines. FIG. 1 provides an exemplary main memory 100 for illustrating certain elements of a typical cache. FIG. 1 represents a simple main memory with a total capacity of 32 bytes. Main memory 100 is organized into four rows and four columns, for a total of 16 cells. FIG. 1 further shows exemplary column 102, exemplary row 104, and exemplary cell 106.

Each row of main memory 100 in FIG. 1, e.g., row 104, contains 8 bytes, and each column, e.g., column 102, contains 4 bytes. The intersections between rows and columns define a total of 16 cells, each of which contains 2 bytes. For example, cell 106 contains 2 bytes of data, and this cell represents the intersection between column 102 and row 104. As can be seen in FIG. 1, each byte of the main memory is assigned a unique binary address. This address is merely a binary number that represents the location of a particular byte of data in the main memory. For the 32-byte main memory of FIG. 1, a total of 5 bits are required to uniquely represent each available memory location.

In main memory 100, addresses are assigned using a left to right, top down approach. As FIG. 1 indicates, each address in row 104, moving from left to right, is one greater than the previous address. Using this organization, it can be noted that, in a 5 bit memory address representing a byte within main memory 100, the two most significant bits (bits 3 and 4) represent the number of a row in the main memory. For example, in FIG. 1, the two most significant bits of the first row 104 are "00," representing the $1^{st}$ row of the main memory. Similarly, the two most significant bits of the next rows are "01," "10," and "11," representing the $2^{nd}$, $3^{rd}$, and $4^{th}$ rows, respectively, of the main memory.

The next two most significant bits (bits 1 and 2) represent the number of a column in the main memory. For example, in FIG. 1, bits 1 and 2 of the first column 102 are "00", representing the $1^{st}$ column in memory. Similarly, bits 1 and 2 of the next columns are "01", "10", and "11", representing the $2^{nd}$, $3^{rd}$, and $4^{th}$ columns, respectively, of the main memory. Finally, the least significant bit (bit 0) represents a particular byte within a main memory cell. With reference to this memory organization, a simple cache memory that may be used in conjunction with this memory will be described.

With reference to FIG. 1, which illustrates a 32 byte main memory, an 8 byte cache that may be associated with the main memory will be considered. For an 8 byte cache storing entries associated with the 32 byte main memory, the cache is able to hold ¼ of the entries in the main memory at a particular point in time. The method by which entries are selected to be stored in the cache and removed from the cache will be described in greater detail below. Unlike main memory 100, the cache is not organized into rows and columns; rather, the cache will typically have one entry per word of the main memory that it can store. In this case of the 8-byte cache being considered with reference to FIG. 1, each word is 2 bytes (since each cell at the intersection between rows and columns contains 2 bytes), and thus the cache will have 4 rows.

Figure 2:
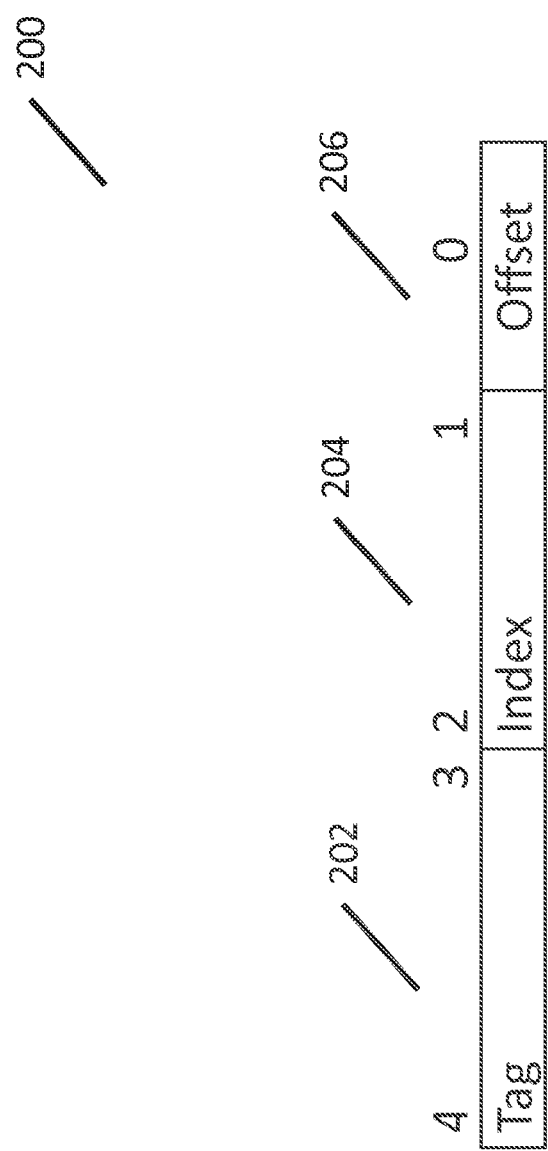
FIG. 2 illustrates an exemplary cache entry address structure associated with FIG. 1.

FIG. 2 provides an example cache entry address structure for the 8-byte cache for storing entries in main memory 100. Cache entry address structure 200 contains tag 202, index 204, and offset 206. In this example, cache entry address structure 200 is 5 bits long, which is the same length as the unique address for each byte in the memory 100. It should be appreciated that a cache entry address structure can be an arbitrary length, depending on the size of the main memory it addresses, but it should generally be the same length as the length of an address in the main memory. In this example, tag 202 is 2 bits, index 204 is 2 bits, and offset 206 is 1 bit. Each value that cache entry address structure 200 can take provides a unique mapping to a single byte in the cache using the tag 202, index 204, and offset 206.

The index 204 of cache entry 200 represents the row of the cache to which cache entry address structure 200 is mapped. Because index 204 comprises 2 bits, there can be a maximum of $2^2=4$ rows in the cache. The offset 206 of cache entry address structure 200 represents the particular byte within a cache row to which cache entry address structure 200 refers. Because offset 206 comprises 1 bit, each cache row contains exactly $2^1=2$ bytes of data. Thus, this cache can store 4*2=8 bytes of data at any given time. Further, in this example, every 8 bytes of the main memory (e.g., main memory locations 00000 to 00111, 01000 to 01111, 10000 to 10111, etc.) is mapped to a unique location in the cache. Finally tag 202 is a unique identifier comprising the upper bits of the main memory location mapped to the cache. In this example, tag 202 comprises 2 bits (continuing the earlier example, the upper bits are the first two digits of address 00000). As a consequence of this structure, all main memory locations sharing the same 3 least significant bits (e.g., main memory locations 00011, 01011, 10011, and 11011) will map to the same location of the cache. The tag 202 stores the necessary additional information to determine which of these four possible entries is presently stored in the cache. This simple cache and main memory are provided for illustrative purposes, and much larger caches and main memories are used for processing high definition video. Additionally, the simple cache described with reference to FIGS. 1 and 2 is not suitable for processing video using multiple processors for reasons that will be detailed below.

Figure 3:
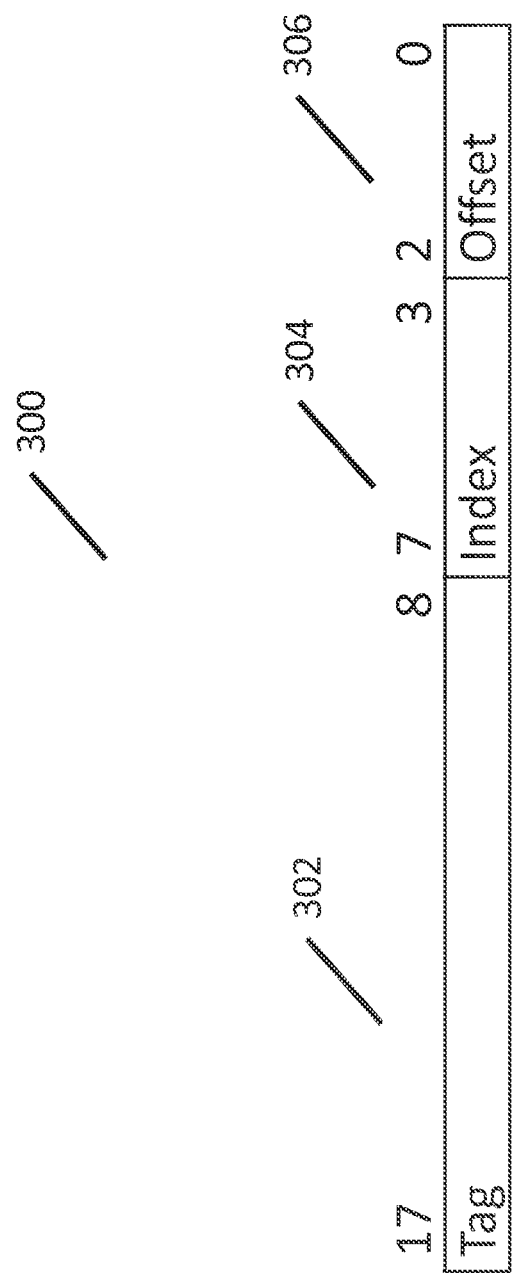
FIG. 3 illustrates an additional cache entry address structure.

A larger cache entry address structure will now be presented in accordance with some embodiments of the disclosure. FIG. 3 provides an example cache entry address structure for a typical cache. Cache entry address structure 300 contains tag 302, index 304, and offset 306. In this example, cache entry address structure 300 is 18 bits long. However, it should be appreciated that a cache entry address structure can be an arbitrary length, depending on the size of the cache. In this example, tag 302 is 10 bits, index 304 is 5 bits, and offset 306 is 3 bits. Each value that cache entry address structure 300 can take provides a unique mapping to a single byte in the cache using the tag 302, index 304, and offset 306.

The index 304 of cache entry 300 represents the row of the cache to which cache entry address structure 300 is mapped. Because index 304 comprises 5 bits, there can be a maximum of $2^5=32$ rows in the cache. The offset 306 of cache entry address structure 300 represents the particular byte within a cache row to which cache entry address structure 300 refers. Because offset 306 comprises 3 bits, each cache row contains exactly $2^3=8$ bytes of data. Thus, this cache can store 32*8=256 bytes of data at any given time. Further, in this example, every 256 bytes of the main memory (main memory locations 0x00000 to 0x000FF, 0x00000 to 0x001FF, 0x00000 to 0x002FF, etc.) is mapped to a unique location in the cache. Finally, tag 302 is a unique identifier comprising the upper bits of the main memory location mapped to the cache. In this example, tag 302 comprises 10 bits (continuing the earlier example, the upper bits are the first three digits of address 0x00000).

The total number of bytes that can be uniquely mapped in a cache entry is related to the number of bits in the entry—e.g., cache entry 300 can uniquely map $2^{18}=256$ kilobytes (kB) of data. This cache entry address structure is commonly used to address cache entries in a wide variety of cache types in the industry.

Figure 4:
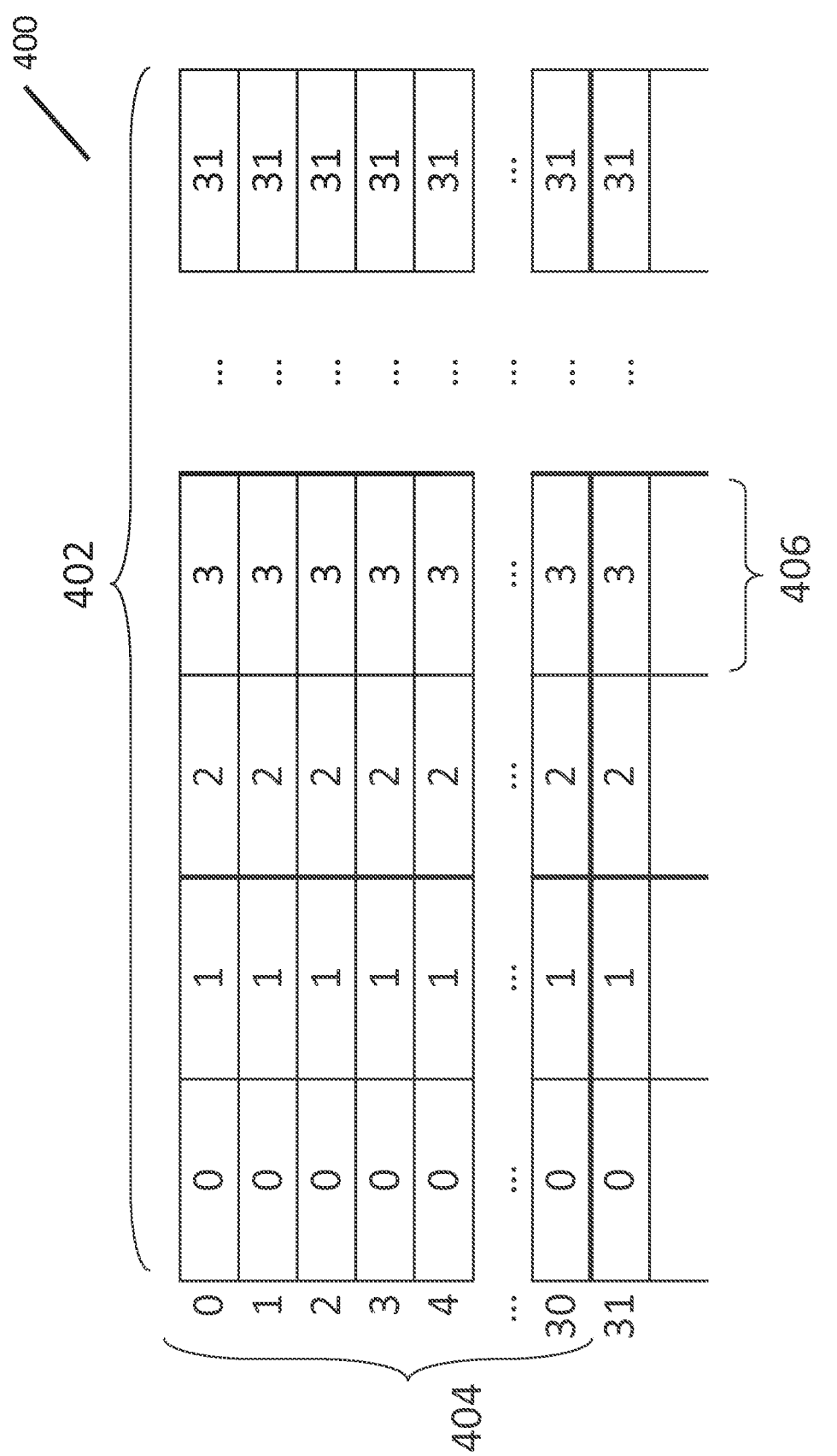
FIG. 4 illustrates an exemplary mapping of a cache onto a memory.

To further illustrate the idea of mapping memory entries into a cache with the cache entry address structure of FIG. 3, the following example is considered. FIG. 4 provides a simple main memory structure 400 that can be copied into a cache with cache entries organized as in FIG. 3. The main memory 400 can include a horizontal width 402 and a vertical height 404. Additionally, the width of a single cell in the memory can be represented by 406.

In one example, the horizontal width 402 of the main memory 400 in FIG. 4 is 512 bytes. Continuing this example, a 256-byte cache is mapped onto the memory. In the typical cache utilizing a cache entry address structure disclosed in FIG. 3, the cache is organized into 32 rows of 8 bytes each in the following way. In the example of FIG. 4, the cache is mapped sequentially so that each successive index maps to a memory entry in an adjacent column. Thus, each row of the cache is mapped directly to consecutive columns within a particular row main memory 400. When the cache is mapped in this manner, the least significant bits that are above the offset bits (bits 3 to 7 (FIG. 3)) represent successive columns within a row of main memory 400. This organization, where consecutive entries within a row map to consecutive lines of the cache, is a consequence of the structure of cache entry address structure 300. In particular, the index bits of the cache entry address structure 300 are located in the least significant portion of the entry. The corresponding portion of the main memory addresses refers to rows within the main memory. Using that structure, the cache must map to the main memory as described above.

Embodiments of the disclosure provide for the use of caches in which the cache entry addresses are stored in a different format than the cache entry address structure 300 in FIG. 3 above. These caches make use of an address structure in which the index of a cache entry is split into an upper and lower portion. This structure will be called a "split-index," and will be described in more detail below. Splitting the index of the cache entries, can significantly reduce the likelihood of cache conflicts when decoding high definition video or other data using parallel processors. For example, in these and other contexts, splitting the index can increase locality of parallel accesses to the video frame.

Figure 5:
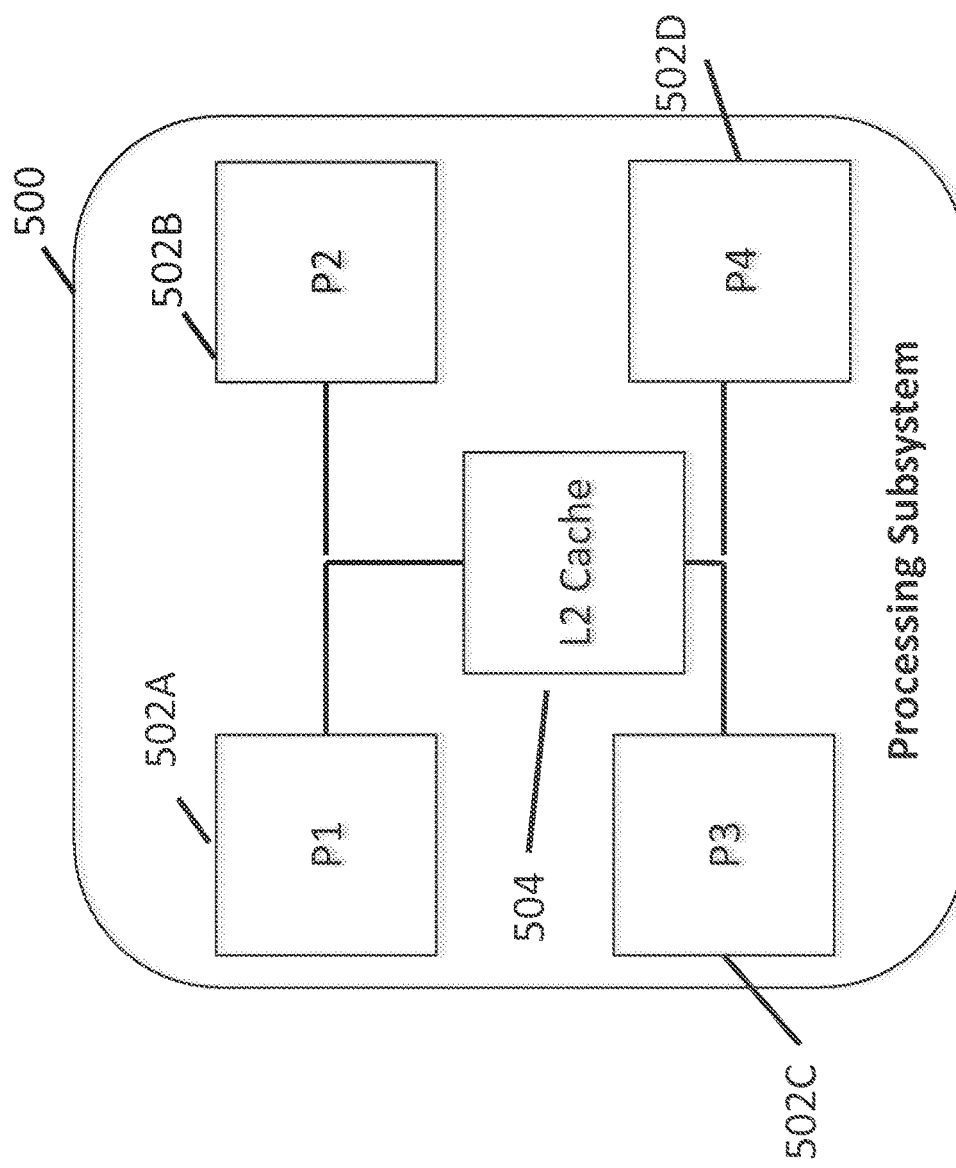
FIG. 5 illustrates an exemplary processing system that may be utilized with a cache having a split-index address structure in accordance with some embodiments.

FIG. 5 illustrates an exemplary processing system 500 that may be utilized in accordance with some embodiments of the disclosure. In FIG. 5, processing subsystem 500 contains processors 502A, 502B, 502C, and 502D, and Level 2 (L2) cache 504.

Processors 502A, 502B, 502C, and 502D can be any hardware with a central processing unit (CPU) core capable of processing computer instructions. The processors 502A, 502B, 502C, and 502D might also be implemented in hardware using an application specific integrated circuit (ASIC), programmable logic array (PLA), digital signal processor (DSP), field programmable gate array (FPGA), or any other integrated circuit. The processors 502A, 502B, 502C, and 502D suitable for the execution of a computer program include, by way of example, special purpose microprocessors, digital signal processors, and any one or more processors of a special purpose digital computer. Generally, the processors 502A, 502B, 502C, and 502D receive instructions and data from a read-only memory or a random access memory or both.

L2 cache 504 comprises fast performing memory capable of caching entries from any of processors 502A, 502B, 502C, and 502D. In one embodiment, L2 cache 504 is a shared cache capable of permitting simultaneous accesses by processors 502A, 502B, 502C, and 502D. In one embodiment, L2 cache 504 can be addressed utilizing a split-index address structure as described in more detail below.

Figure 6:
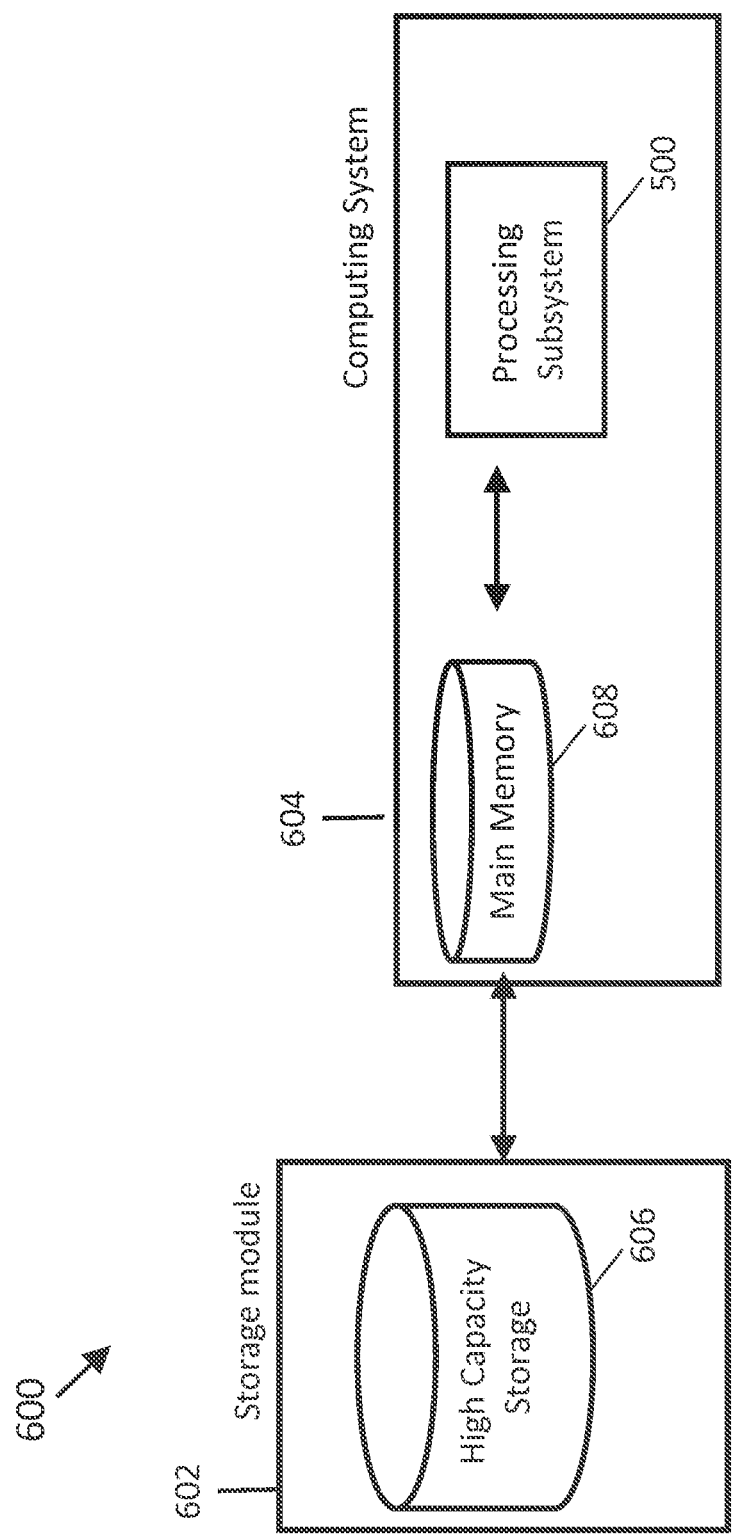
FIG. 6 illustrates an exemplary computing and storage system in accordance with some embodiments.

FIG. 6 provides an exemplary computing and storage system 600 that may be utilized in accordance with some embodiments of the disclosure. In FIG. 6, computing and storage 600 contains storage module 602 and computing system 604. Storage module 602 contains high capacity storage 606. Computing system 604 contains main memory 608 and processing subsystem 500.

High capacity storage 606 within storage module 602 may be directly connected to main memory 608 within computing system 604. In one embodiment, high capacity storage 606 can be a non-volatile physical storage medium capable of storage large amounts of data. In one embodiment, main memory 608 can be any memory capable of dynamically storing and accessing data entries. In one exemplary implementation, main memory 608 can be a Random Access Memory (RAM) capable of storage entries from high capacity storage 606. Processing subsystem 500 may directly communicate with main memory 608. L2 cache 504 may further cache entries stored within main memory 608. In one embodiment, L2 cache 504 may store entries utilizing a split-index address structure as described below.

Figure 7A:
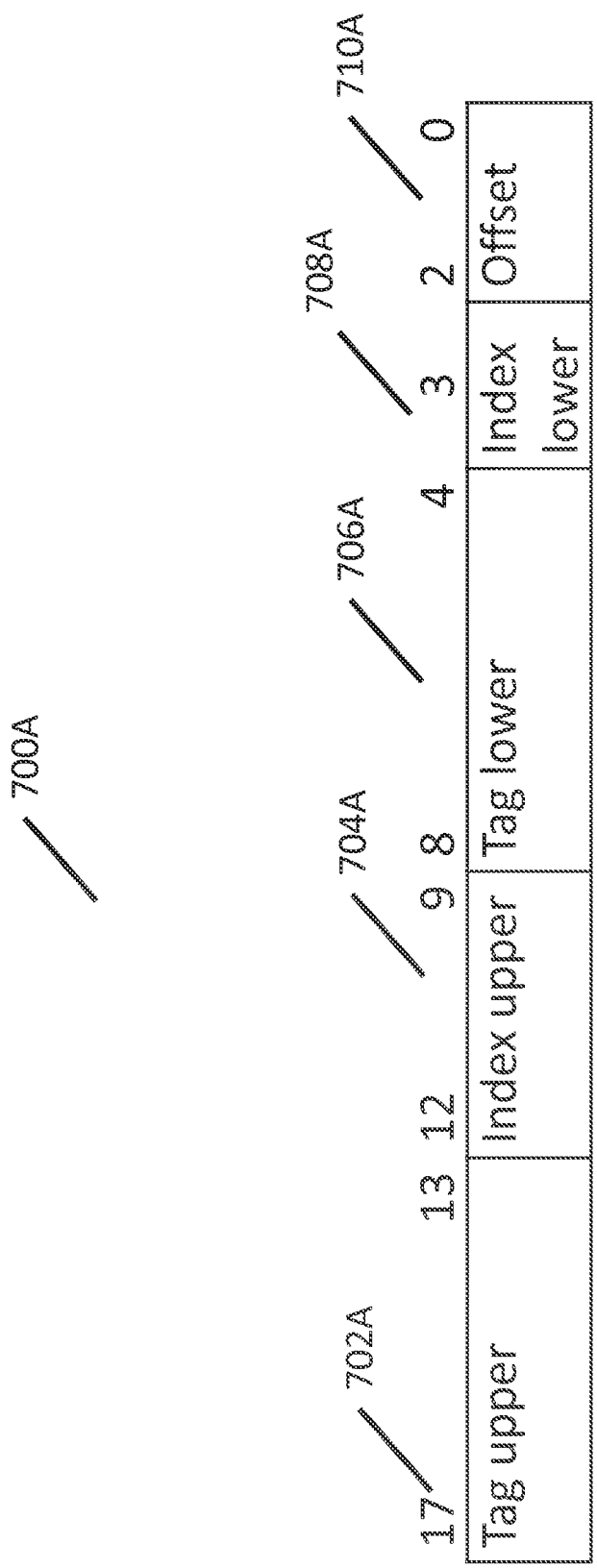
FIGS. 7A-7C illustrate exemplary split-index cache entry address structures in accordance with some embodiments.
Figure 7B:
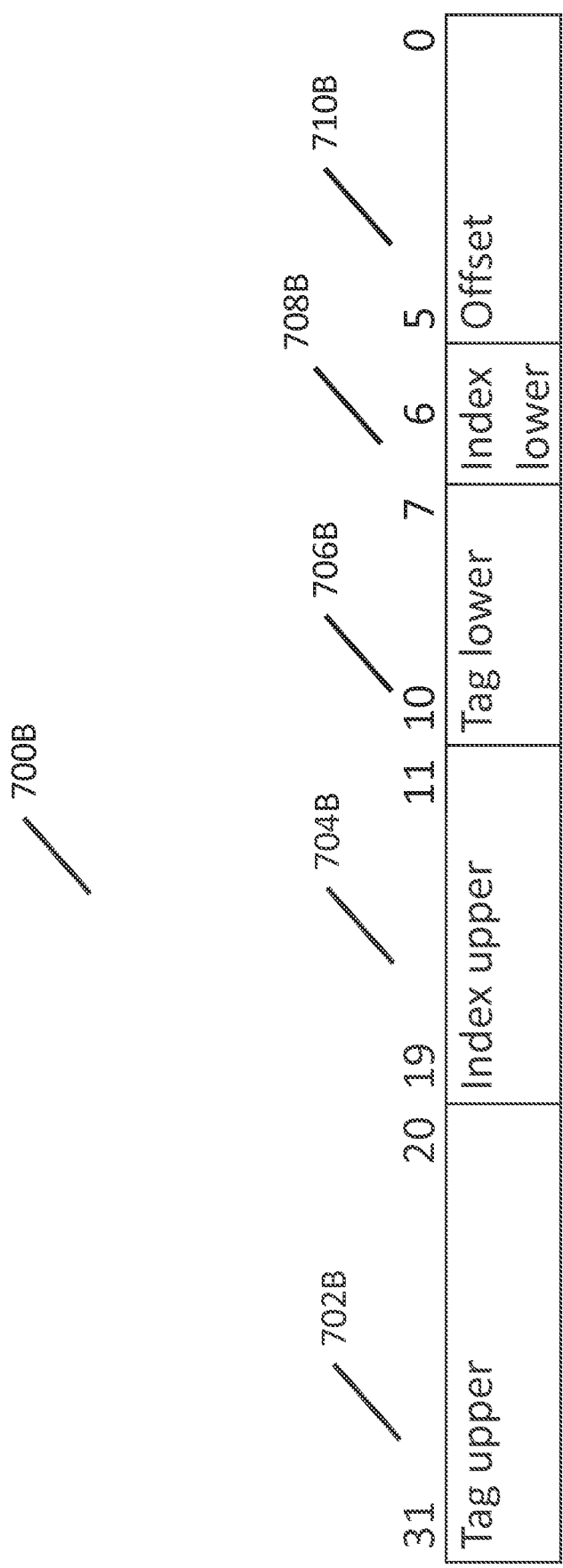
Figure 7C:
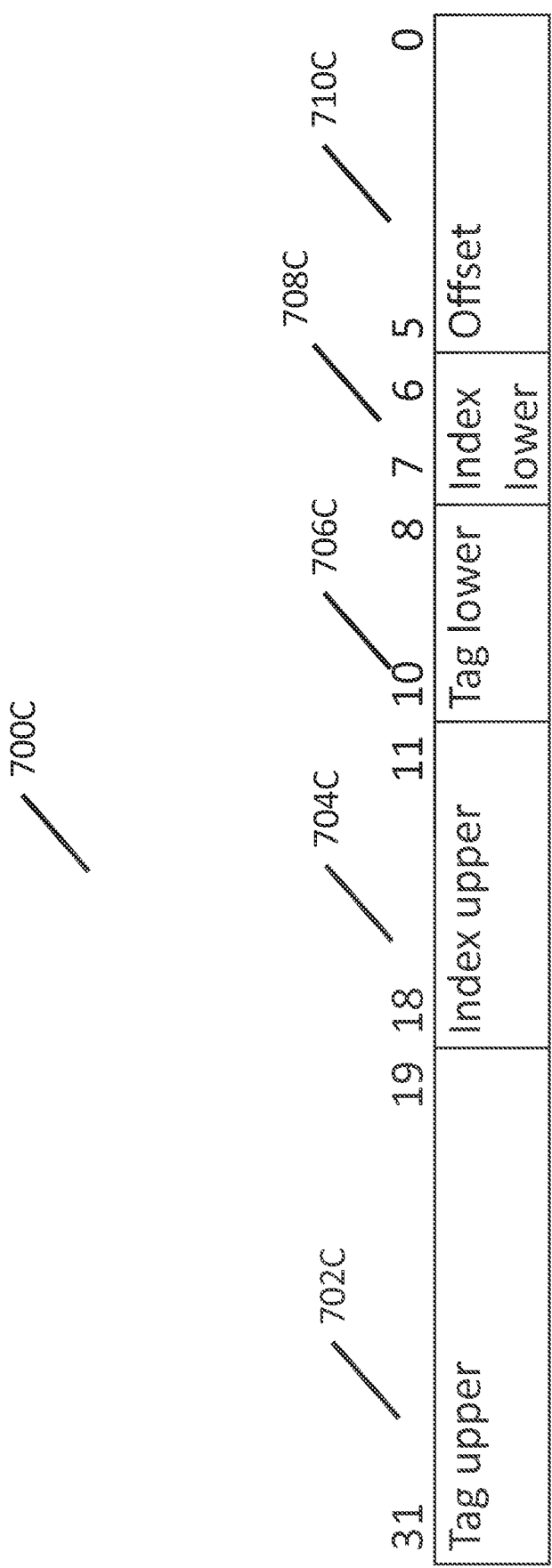

FIGS. 7A-7C provide examples of split-index cache entries in accordance with some embodiments of the disclosure. In FIGS. 7A-7C, cache entry address structures comprise an offset, upper and lower tag, and an upper and lower index.

FIG. 7A provides an example of a cache entry address structure for a small cache in accordance with certain embodiments of the disclosure. Cache entry address structure 700A contains upper tag 702A, upper index 704A, lower tag 706A, lower index 708A, and offset 710A. In this example, cache entry address structure 700A is 18 bits long. However, it should be appreciated that a cache entry address structure can be an arbitrary length, depending on the size of the cache. In this example, upper tag 702A is 5 bits, upper index 704A is 4 bits, lower tag 706A is 5 bits, lower index 708A is 1 bit, and offset 710A is 3 bits. It should be noted that although the index and tag have been split into upper and lower parts, they remain the same length in total as the corresponding tag and index of a traditional cache entry address.

The combination of upper index 704A and lower index 708A of cache entry address structure 700A still represents the row of the cache to which cache entry address structure 700A is mapped. Because upper index 704A and lower index 708A together comprise 5 bits, there can be a maximum of $2^5=32$ rows in the cache. The offset 710A of cache entry address structure 700A still represents the particular byte within a cache row to which cache entry address structure 700A refers. Because offset 710A comprises 3 bits, each cache row contains exactly $2^3=8$ bytes of data. Thus, this cache can store 32*8=256 bytes of data at any given time. Similar to the prior examples, chunks of 256 bytes of the memory map to unique locations in the cache. Finally, the concatenation of upper tag 702A and lower tag 706A comprises a unique identifier for the memory location mapped to the cache. In this example, the concatenated tag comprises 10 bits.

The particular bits chosen for the upper part 704A and lower part 708A of the index have special significance to the mapping of cache entries. The lower part 708A is chosen to represent a column of the memory to which it maps (e.g., a column of memory 500). The lower part of the index 708A is only 1 bit long, and thus it can only represent one of two columns. The remainder of the index, upper part 704A, is chosen to represent a row of the memory to which it maps. In this example, upper part 704A of the index is 4 bits long, and thus it can represent one of 16 columns. This organization of cache entries thus significantly alters the locations of memory elements within the cache.

It should be noted that in the examples of FIGS. 2 and 3, the index bits only represent different columns of a particular row because of their location in the cache entry address structure (in FIG. 2, bits 1 and 2 are representative of columns, and bits 3 and 4 are representative of rows). If the bits representing the tag and index were swapped in FIG. 2, then the cache entries would represent different rows within the same column. With reference to FIG. 7A, the locations of the split-indexes are carefully chosen because they are representative of the least significant bits of row and column addresses in the memory.

FIGS. 7B and 7C illustrate cache entry address structures corresponding to larger memories in accordance with some embodiments of the disclosure. In FIG. 7B, cache entry address structure 700B contains upper tag 702B, upper index 704B, lower tag 706B, lower index 708B, and offset 710B. In this example, cache entry address structure 700B is 32 bits long. However, it should be appreciated that a cache entry address structure can be an arbitrary length, depending on the size of the cache. In this example, upper tag 702B is 12 bits, upper index 704B is 9 bits, lower tag 706B is 4 bits, lower index 708B is 1 bit, and offset 710B is 6 bits.

Assuming a 2-way set associative cache, the cache represented by this entry address structure is determined as follows. Because the offset is 6 bits, each row of this cache contains $2^6=64$ bytes. Further, because the lower part 708B of the split-index is 1 bit and the upper part is 9 bits, we know that each "block" of memory that is mapped into the cache is $2^1=2$ columns wide and $2^9=512$ rows tall, and is 64 kB in size. Because the cache is two way set associative, the total size of the cache is $2^6*2^1*2^9*2^1=2^{17}=128$ kB.

In FIG. 7C, cache entry address structure 700C contains upper tag 702C, upper index 704C, lower tag 706C, lower index 708C, and offset 710C. In this example, cache entry address structure 700C is 32 bits long. In this example, upper tag 702C is 13 bits, upper index 704C is 8 bits, lower tag 706C is 3 bits, lower index 708C is 2 bits, and offset 710C is 6 bits.

Assuming a 2-way set associative cache, the cache represented by this entry address structure is determined as follows. Because the offset is 6 bits, each row of this cache contains $2^6=64$ bytes. Further, because the lower part 708B of the split-index is 2 bits and the upper part is 8 bits, we know that each "block" of memory that is mapped into the cache is $2^2=4$ columns wide and $2^8=256$ rows tall, and is 64 kB in size. Because the cache is two way set associative, the total size of the cache is $2^6*2^1*2^9*2^1=2^{17}=128$ kB. Using the formats described in FIGS. 7A, 7B, and 7C, the cache can be organized to map to an arbitrary block arrangement over a memory.

Figure 8A:
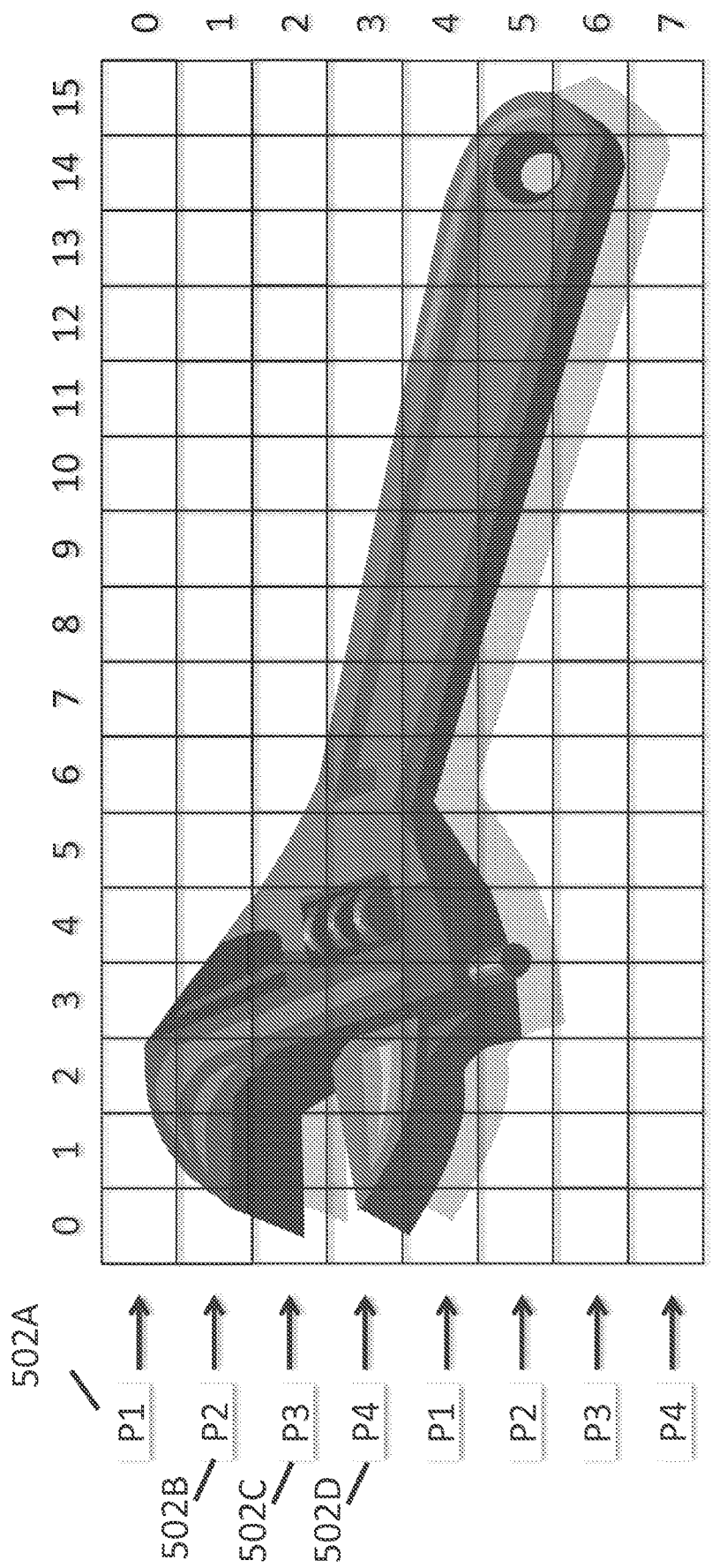
FIGS. 8A-8C illustrate the processing of blocks in an image frame in accordance with some embodiments.
Figure 8B:
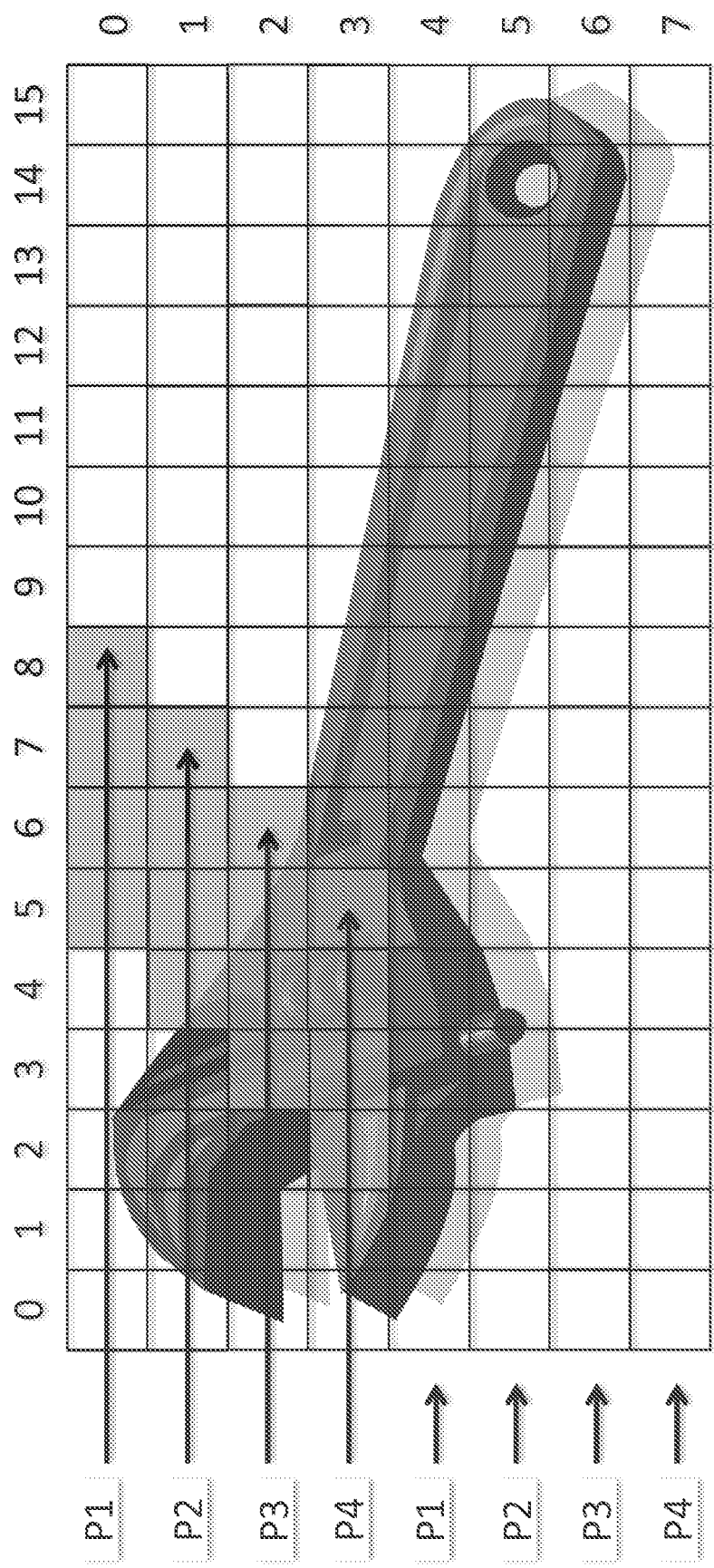
Figure 8C:
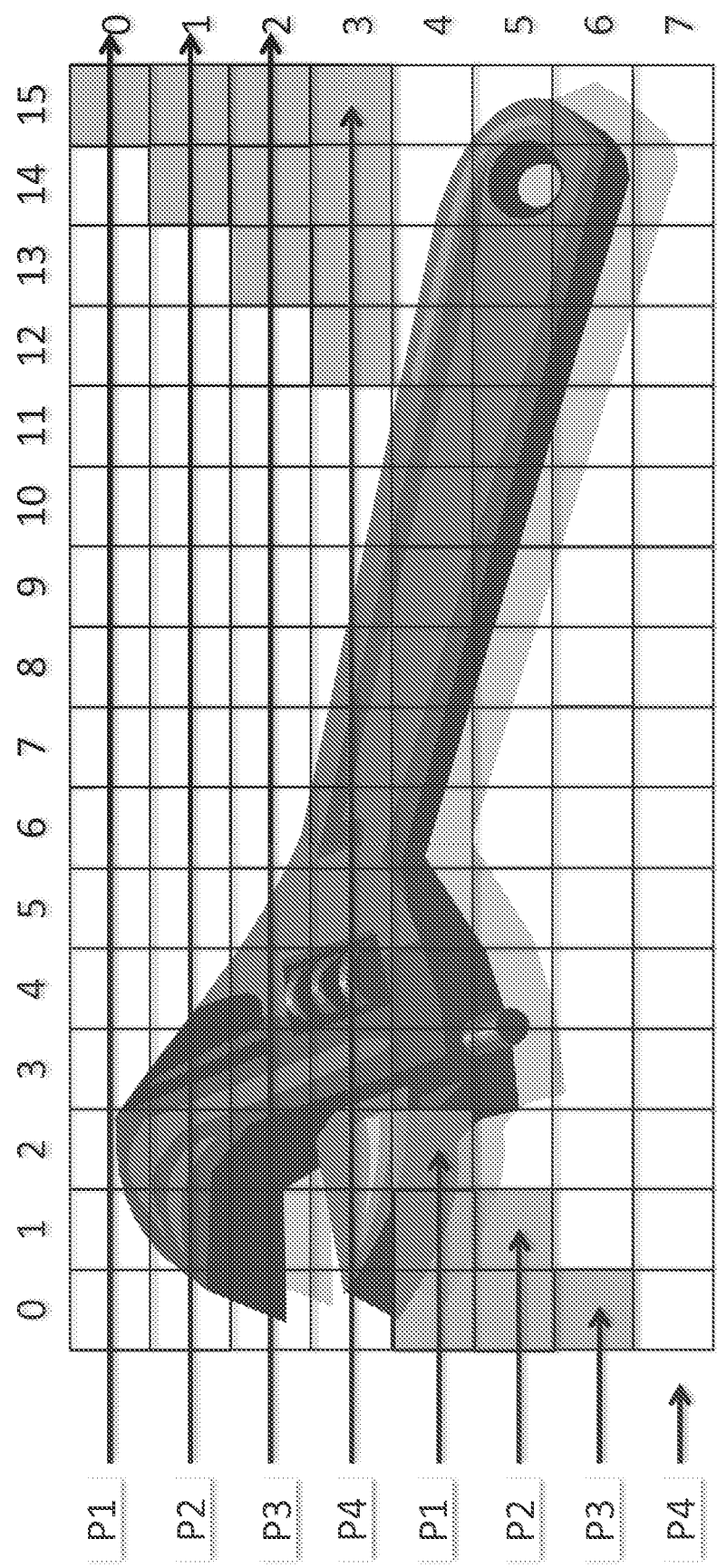

FIGS. 8A-8C and 9A-9B illustrate the application of the split-index address structure to a video decoding system utilizing multiple processors in parallel. In particular, FIGS. 8A-8C provide an exemplary image decoded in accordance with the H.264 video format, or other data formats. FIG. 8A illustrates a frame of an image (e.g., a wrench) broken into its constituent macroblocks, and FIGS. 8B and 8C demonstrate the same image during different stages of the decoding process.

FIG. 8A provides a grid overlaid on top of a sample image frame in accordance with some embodiments. In FIG. 8A, the grid is composed of 8 rows and 16 columns, for a total of 128 blocks. It is appreciated that this example illustrates 128 blocks composing an image for illustrative purposes only, and that a frame of high definition video will be composed of many more macroblocks in practice. Processors 502A (P1), 502B (P2), 502C (P3), and 502D (P4) each decode a different row of the image frame. For example, in FIG. 8A, processor 502A decodes the first row (row 0), processor 502B decodes the second row (row 1), processor 502C decodes the third row (row 3), and processor 502D decodes the fourth row (row 3). Upon finishing processing a row, each processor advances four rows ahead to continue processing. Thus, processor 502A decodes the fifth row (row 4), processor 502B decodes the sixth row (row 5), processor 502C decodes the seventh row (row 6), and processor 502D decodes the eighth row (row 7).

FIG. 8B illustrates decoding of the image frame at a stage after processing has begun. In FIG. 8B, blocks currently being processed are represented by the boxes highlighted in gray. At this stage, processor 502A processes blocks in columns 5-8 of row 0 of the image frame, processor 502B processes blocks in columns 4-7 row 1 of the image frame, processor 502C processes blocks in columns 3-6 of row 2 of the image frame, and processor 502D processes blocks in columns 2-5 of row 3 of the image frame. It should be appreciated that a typical processor will decode four blocks simultaneously when decoding high definition video. However, processors may decode greater or fewer numbers of blocks and rows simultaneously depending on speed and memory constraints. Additionally, it is typical that processors will decode blocks in different columns of the image frame simultaneously, as illustrated in FIG. 8B, although this is also not required.

FIG. 8C illustrates decoding of the image frame at a later stage of processing. At this stage, processor 502A processes a block in column 16 of row 0 of the image frame and blocks in columns 0-2 in row 4 of the image frame, processor 502B processes blocks in columns 14-15 of row 1 of the image frame and blocks in columns 0-1 of row 5 of the image frame, processor 502C processes blocks in columns 13-15 of row 2 of the image frame and a block in column 0 of row 6 of the image frame, and processor 502D processes blocks in columns 12-15 of row 3 of the image frame. Processing rows of an image frame simultaneously via different processors as shown in FIGS. 8A-8C is made possible by tiling the image frame into memory, as described above.

Figure 9A:
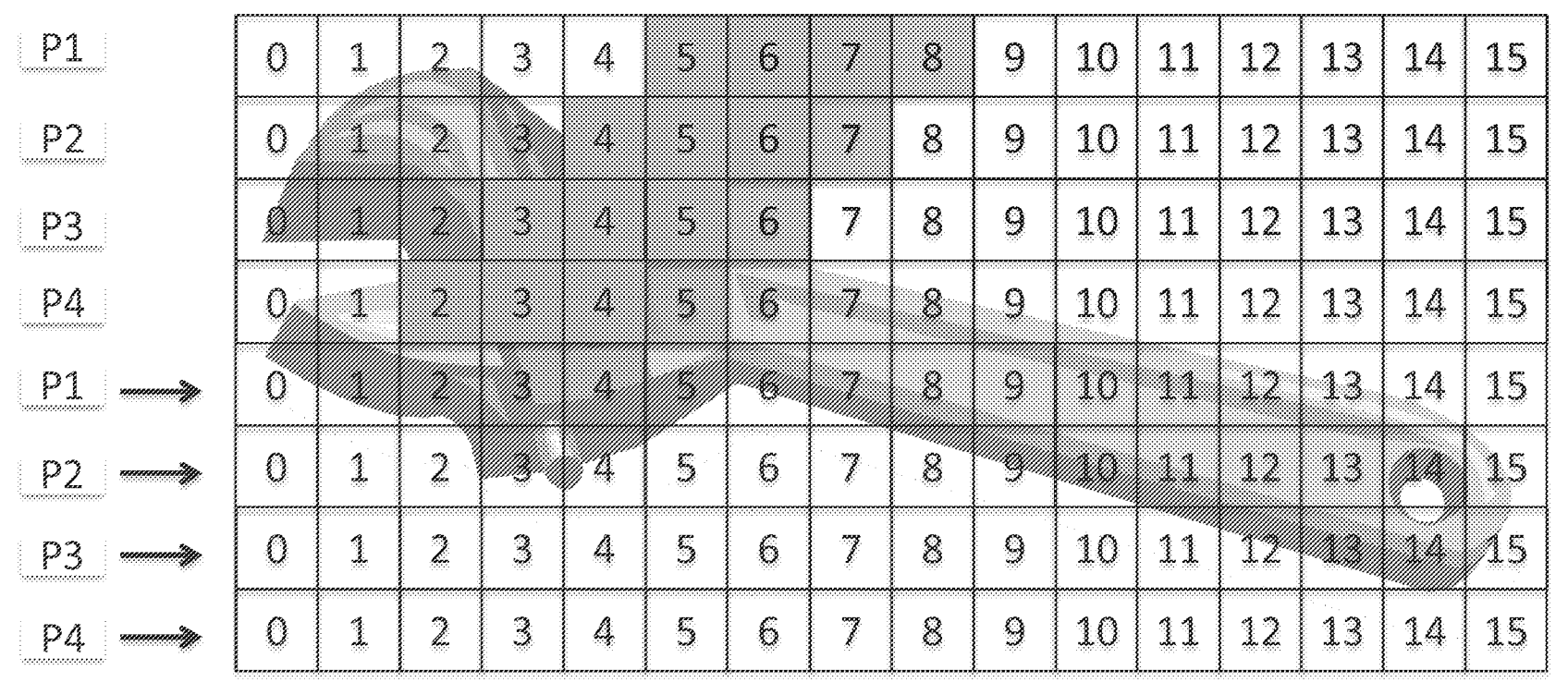
Figure 9B:
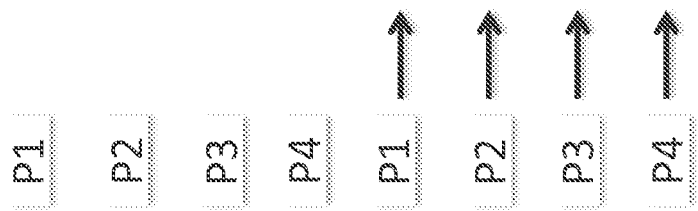

FIGS. 9A and 9B illustrate the mapping of cache lines onto the blocks of the image frame of FIGS. 8A-8C in accordance with some embodiments. FIG. 9A illustrates a cache line mapping according in a typical cache, while FIG. 9B illustrates a cache line mapping utilizing a split-index cache address structure described above.

In FIG. 9A, the mapping of cache lines of a typical 16 byte cache is illustrated. For illustrative purposes, each block in the image frame is assumed to consist of one byte. FIG. 9A shows that, for a typical cache, each block within each row of the image frame will map to a different row of the cache. As can be seen from FIG. 9A, when four blocks are simultaneously processed by each of the different processors, this can lead to conflicts where more than one processor uses a block that maps to the same location of the cache. For example, in FIG. 9A, processors 502A, 502B, and 502C each make simultaneous reads to blocks that map to line 5 of the cache. Thus, at least two of these access requests will result in cache misses, leading to reduced performance. Conflicts such as this arise when a previously decoded image is accessed as a reference image simultaneously by multiple parallel processors in parallel. Since the parallel processors are each working on spatially close blocks of the image there is a high probability that the parts of the reference image they require will overlap. Due to the cache layout in FIG. 9A, different parts of the reference image required by each processor will map to the same locations in the cache.

In FIG. 9B, the mapping of cache lines of cache that has been mapped with a split-index structure is provided in accordance with some embodiments of the disclosure. FIG. 9B shows that blocks within each row of an image frame may map to cache lines in a repeating fashion. For example, the first four blocks of row 1 of the image frame map to cache lines 0-3, as in FIG. 9A. However, unlike in FIG. 9A, the next four blocks in row 1 also map to cache lines 0-3. Every four blocks in this image frame within row 1 map to the same set of cache lines, as shown in FIG. 9B. As can be seen from the image, every block of every row decoded by processor 502A can only map to cache lines 0-3. Similarly, every block of every row decoded by processor 502B only maps to cache lines 4-7. When mapping the cache to the image frame this way, it is clear that the processors 502A-502D cannot access blocks that map to the same cache lines as another processor. Thus, this arrangement eliminates cache conflicts resulting from simultaneous accesses from different processors.

The particular mapping of the cache lines onto the image frame to avoid conflicts is dependent upon the number of processors and the number of blocks processed in parallel by a single processor. The cache should uniquely map as many blocks in a row of an image frame as are processed simultaneously by a given processor. In FIG. 9B, four blocks may be processed simultaneously, and thus at least four rows of the cache are needed per row of an image frame. In addition, because four processors are used, at least four unique sets of blocks should be available, one set for each processor. These constraints lead to the chosen arrangement of cache lines for the 16-byte cache in FIG. 9B. It should be noted that if the cache were larger than necessary, any mapping scheme that preserves the above requirements is suitable to avoid the conflicts arising from the multiprocessor system. As such, using this scheme data can be tiled into the main memory and mapped to cache lines according to the particular needs of the application software.

FIG. 10 illustrates a particular arrangement of an H.264 image frame 1000 being decoded by parallel processors in accordance with some embodiments. FIG. 10 contains row 1002 and row 1004. Each row stores an arbitrary number of macroblocks associated with an image frame of H.264 video, with the caveat that each row of memory only stores macroblocks associated with a single row of data in an image frame.

Based on this arrangement, the cache entry addresses are organized such that every fifth macroblock maps to the same cache entries (e.g., in the earlier discussion of FIGS. 6A-6C, the lower part of the index is 2 bits so that it can map to 4 columns). Thus, every fifth macroblock in row 1002 will map to the same rows of the cache, and every fifth macroblock in row 1004 will map to the same rows of the cache. However, no macroblocks in row 1002 will map to any of the same cache lines as the macroblocks in 1004, and none of the macroblocks in row 1004 will map to any of the same cache lines as the macroblocks in row 1002. Importantly, in one embodiment, different rows of the image frame are decoded by different processors in parallel. By organizing the cache in this manner, the various processors using the shared cache will never attempt to overwrite portions of the cache in use by the other processors. This has the effect of significantly reducing the cache miss rate by preventing processors from fighting for cache space, thereby effectively increasing the cache hit rate overall.

It will be appreciated that whilst several different arrangements have been described herein, that the features of each may be advantageously combined together in a variety of forms to achieve advantage.

In the foregoing specification, the application has been described with reference to specific examples. It will, however, be evident that various modifications and changes may be made therein without departing from the broader spirit and scope of the invention as set forth in the appended claims. For example, the connections may be any type of connection suitable to transfer signals from or to the respective nodes, units or devices, for example via intermediate devices. Accordingly, unless implied or stated otherwise the connections may for example be direct connections or indirect connections.

It is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

Furthermore, those skilled in the art will recognize that boundaries between the functionality of the above described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word "comprising" does not exclude the presence of other elements or steps than those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A processor subsystem comprising:
   one or more processor cores, the one or more processor cores to communicate with a memory; and
   a cache including a plurality of cache lines, the cache to:
      determine a first index from a first set of bits of a first address associated with a first location of the memory;
      determine a second index from a second set of bits of the first address, the second set of bits of the first address separated from the first set of bits of the first address by a third set of bits of the first address; and
      store data from the first location of the memory in a first one of the cache lines referenced by a combined index, the combined index based on a combination of the first index and the second index.

2. The processor subsystem of claim 1, wherein the cache is to concatenate the first index and the second index to determine the combined index.

3. The processor subsystem of claim 1, wherein the cache is further to combine the third set of bits of the first address and a fourth set of bits of the first address to determine an identifier to identify the first location of the memory.

4. The processor subsystem of claim 3, wherein the cache is to concatenate the third set of bits of the first address and the fourth set of bits of the first address to determine the identifier.

5. The processor subsystem of claim 3, wherein the cache is to determine a position within the first one of the cache lines to which the first location of the memory is mapped, the cache to determine the position based on a fifth set of bits of the first address.

6. The processor subsystem of claim 1, wherein at least one of the first set of bits of the first address, the second set of bits of the first address, or the third set of bits of the first address has a size of one bit.

7. The processor subsystem of claim 1, wherein the one or more processor cores include at least two processor cores, and respective ones of the at least two processor cores are to access different ones of the cache lines simultaneously.

8. An apparatus comprising:
   cache lines referenced by indexes;
   means for determining a first index portion and a second index portion from respective first and second sets of bits of a first address associated with a first location of memory, the first and second sets of bits of the first address separated by a third set of bits of the first address; and
   means for mapping the first location of the memory to a first one of the cache lines referenced by a first one of the indexes, the means for mapping to determine the first one of the indexes based on a combination of the first index portion and the second index portion, the cache to store data from the first location of the memory in the first one of the cache lines.

9. The apparatus of claim 8, wherein the means for mapping is to concatenate the first index portion and the second index portion to determine the first one of the indexes.

10. The apparatus of claim 8, wherein the means for determining is to combine the third set of bits of the first address and a fourth set of bits of the first address to determine an identifier to identify the first location of the memory.

11. The apparatus of claim 10, wherein the means for determining is to concatenate the third set of bits of the first address and the fourth set of bits of the first address to determine the identifier.

12. The apparatus of claim 10, wherein the means for determining is to determine a position within the first one of the cache lines to which the first location of the memory is mapped, the position to be determined based on a fifth set of bits of the first address.

13. The apparatus of claim 8, wherein at least one of the first set of bits of the first address, the second set of bits of the first address, or the third set of bits of the first address has a size of one bit.

14. The apparatus of claim 8, further including means for scheduling at least two processor cores to access different ones of the cache lines simultaneously.

15. A method comprising:
   determining, with a logic circuit, a first index from a first set of bits of a first address associated with a first location of memory;
   determining, with the logic circuit, a second index from a second set of bits of the first address, the second set of bits of the first address separated from the first set of bits of the first address by a third set of bits of the first address; and
   storing data from the first location of the memory in a first one of a plurality of cache lines referenced by a combined index, the combined index based on a combination of the first index and the second index.

16. The method of claim 15, further including concatenating the first index and the second index to determine the combined index.

17. The method of claim 15, further including combining the third set of bits of the first address and a fourth set of bits of the first address to determine an identifier to identify the first location of the memory.

18. The method of claim 17, wherein the combining of the third set of bits of the first address and the fourth set of bits of the first address includes concatenating the third set of bits of the first address and the fourth set of bits of the first address to determine the identifier.

19. The method of claim 17, further including determining a position within the first one of the cache lines to which the first location of the memory is mapped, the determining of the position based on a fifth set of bits of the first address.

20. The method of claim 15, wherein at least one of the first set of bits of the first address, the second set of bits of the first address, or the third set of bits of the first address has a size of one bit.

* * * * *